Jan. 17, 1933.  E. G. TODT  1,894,454
WELDING CLAMP
Filed Sept. 11, 1930    5 Sheets-Sheet 1
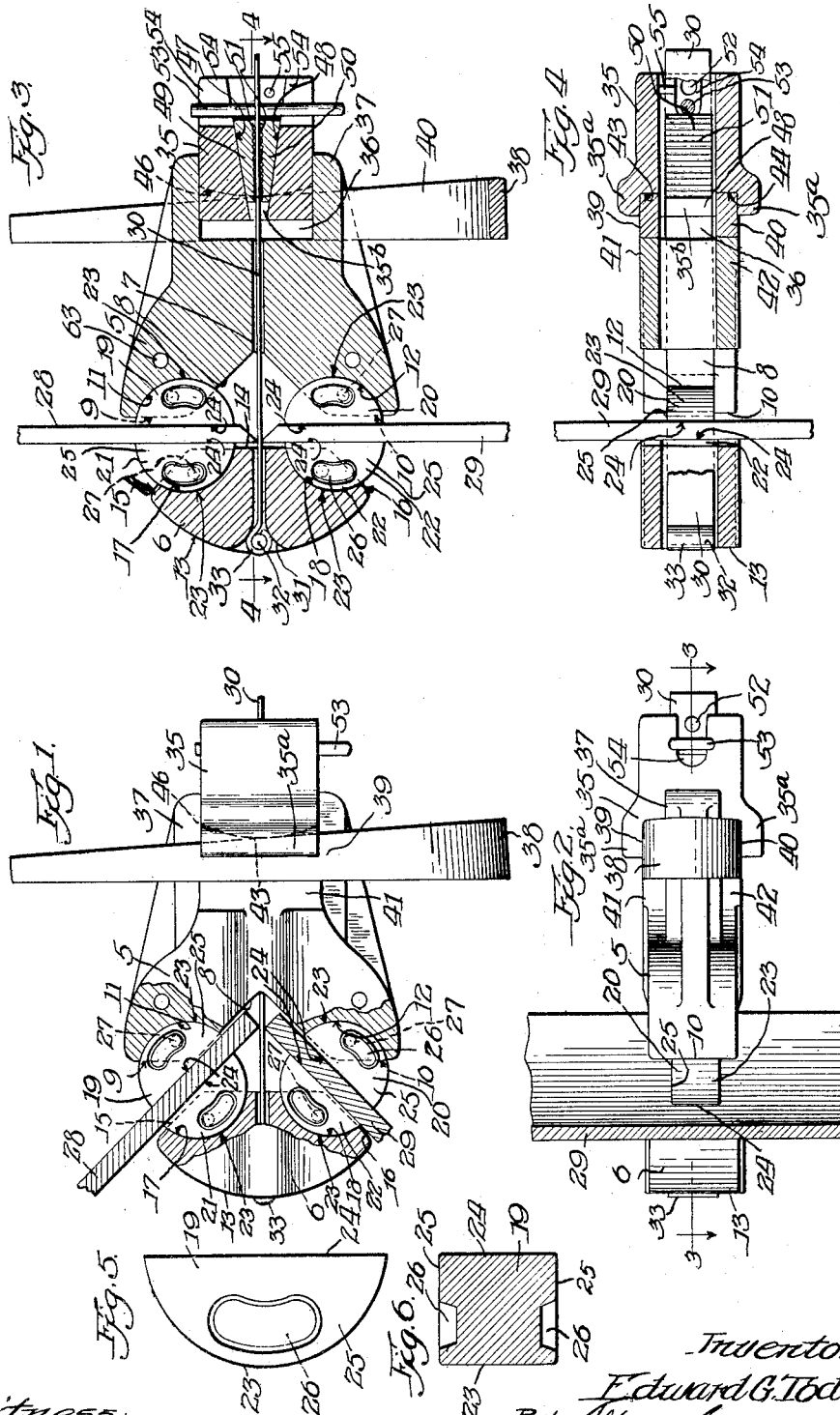
Inventor:
Edward G. Todt

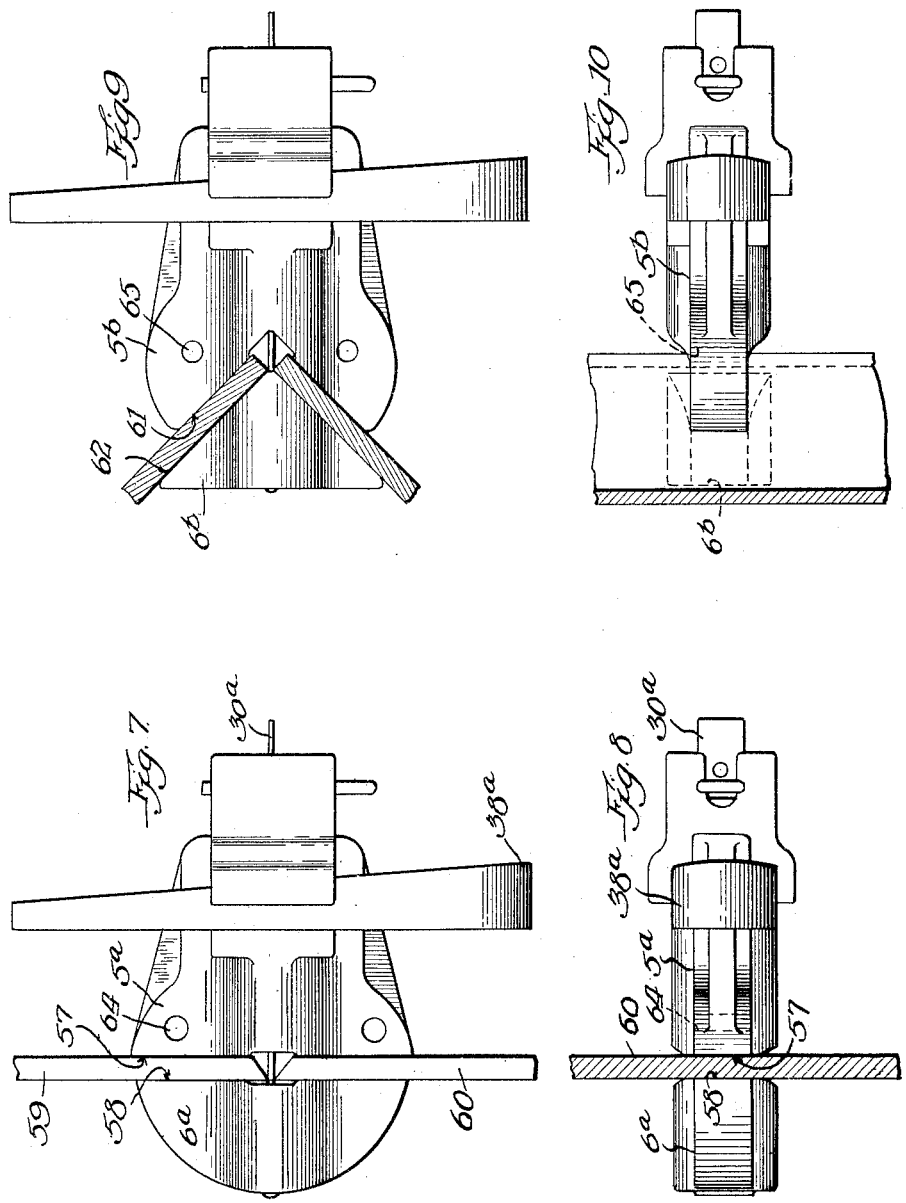

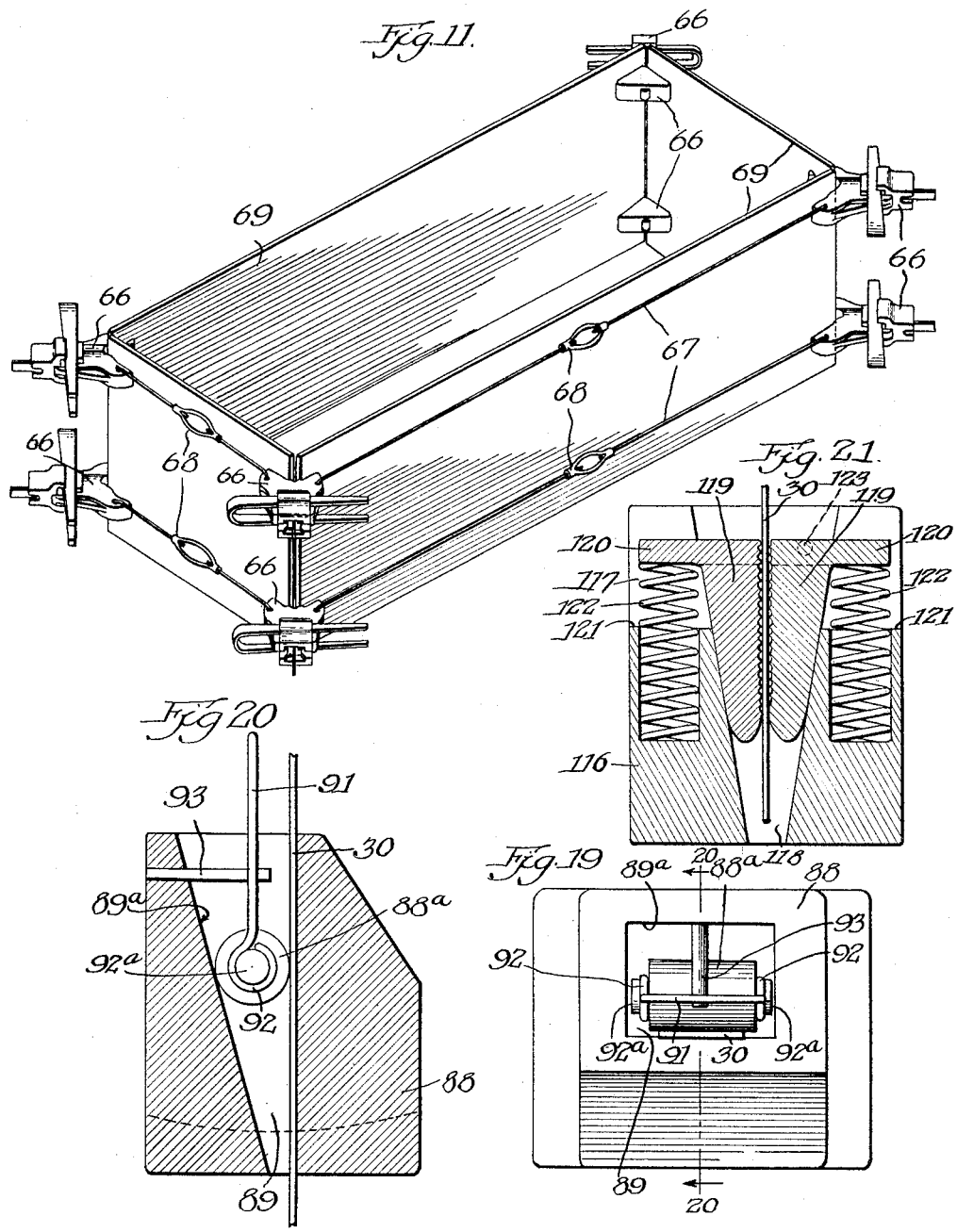

Jan. 17, 1933. E. G. TODT 1,894,454
WELDING CLAMP
Filed Sept. 11, 1930 5 Sheets-Sheet 4
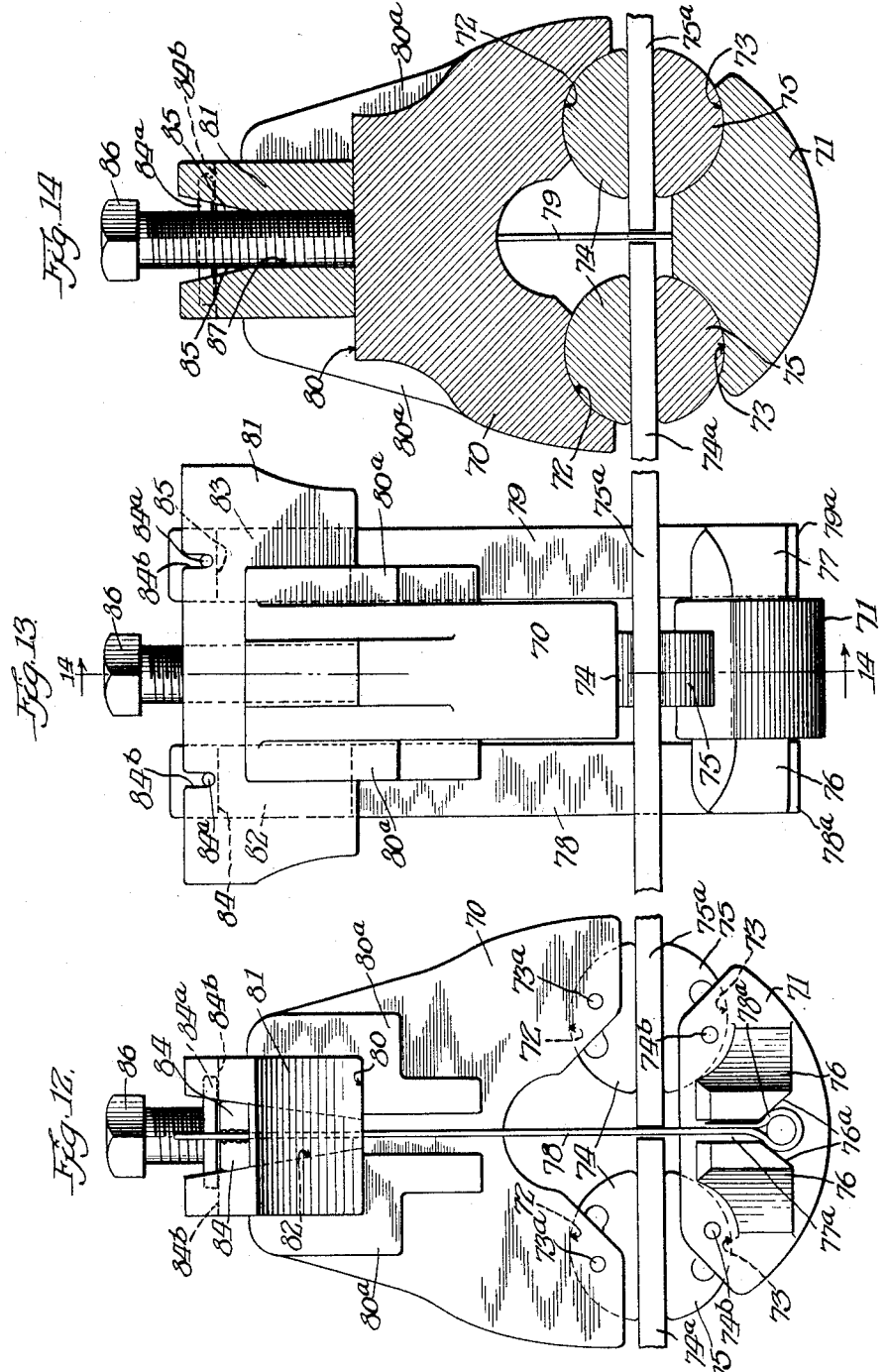
Witness:
R. B. Davison.
Inventor:
Edward G. Todt.
By Paine Carpenter
Atty

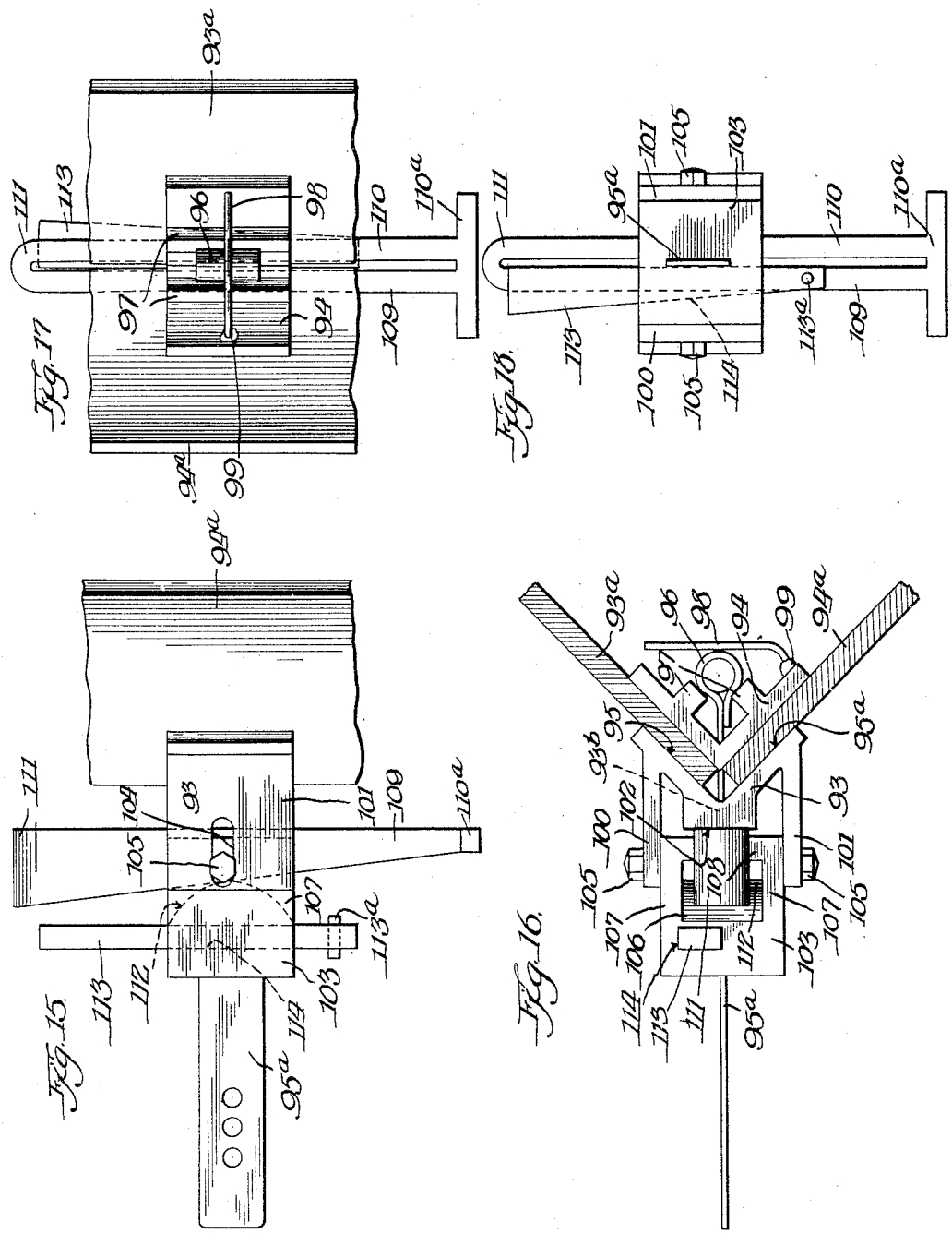

Patented Jan. 17, 1933

1,894,454

UNITED STATES PATENT OFFICE

EDWARD G. TODT, OF CHICAGO, ILLINOIS

WELDING CLAMP

Application filed September 11, 1930. Serial No. 481,125.

This invention relates in general to holding devices, commonly called clamps or vises, and more particularly to an improved device of this character for holding in desired position two or more elements temporarily in alignment or in various positions of angular relation.

While the invention is illustrated and described as a welding clamp, that is, a clamp for holding two or more sheets or plates of metal or the like temporarily in position for welding, it will be understood that the invention finds a wide field of utility for analogous purposes.

In the process of welding two or more metallic elements the usual custom has been to employ some makeshift means for supporting the adjacent edges or portions of the elements to be welded and then tack-welding the elements, later completing the entire weld. This operation is extremely difficult to perform, owing to the fact that heretofore there have been no practical devices within my knowledge available for temporarily holding the elements to be welded during the tack-welding step, and the operation usually requires the cooperation of two men, one to hold the elements in position and the other to perform the tack-welding step. An ordinary vise, or other clamping means, will not serve the purpose, for the reason that the jaws of any clamp employed for this purpose must be quickly and conveniently assembled and removed from the work, otherwise, the time consumed in applying any prior holding means known to me, makes the use of such means prohibitive.

The principal objects and advantages of this invention reside in the provision of an improved clamp comprising readily detachable object-engaging jaws and means for bringing these jaws into clamping engagement with an object or objects; the provision of a clamp of the character referred to which may be conveniently and quickly applied in holding position by one man, particularly useful when employed for retaining bars, plates, or the like, in angular or aligned positions for welding; the provision of an improved clamp of the character referred to, having an improved form of tying means which facilitates the accurate alignment of the jaws when gripping objects to be held thereby; the provision of a clamp of the character referred to, including means for exerting the required force on the tying means for the purpose referred to; the provision of an improved clamp, including a novel form of tying element which may be readily replaced, upon breakage or other damage thereto, at small cost.

The foregoing and such other objects and advantages as may appear or be pointed out as this description proceeds are attained in the structural embodiment of the invention illustrated in the accompanying drawings, in which:

Figure 1 is an elevational view, partly in section, illustrating a form of the invention disclosed herein;

Figure 2 is a similar view of the form of the invention shown in Figure 1, viewed from another aspect;

Figure 3 is a longitudinal, sectional view, taken on the line 3—3 of Figure 2, looking in the direction indicated by the arrows;

Figure 4 is a sectional view, taken on the line 4—4 of Figure 3 looking in the direction indicated by the arrows;

Figures 5 and 6 are elevational and transverse sectional views of a detail, respectively;

Figure 7 is a view similar to Figure 1 of an alternative form of the invention;

Figure 8 is an elevational view of the device shown in Figure 7, viewed from another aspect;

Figure 9 is a further alternative form of the invention and

Figure 10 is an elevational view of the device of Figure 9 viewed from another aspect;

Figure 11 is a perspective schematic view illustrating one useful application of the device of the invention;

Figure 12 is a side elevational view of a further alternative form of the invention;

Figure 13 is a view similar to Figure 12 viewing the device from a different aspect;

Figure 14 is a longitudinal sectional view taken on the line 14—14 of Figure 13 looking in the direction indicated by the arrows;

Figure 15 is an elevational view of a still further modified form of the invention;

Figure 16 is a view of the device of Figure 15 viewed from one edge thereof;

Figures 17 and 18 are views of the same device from other angles;

Figure 19 is a plane view of a detail;

Figure 20 is a sectional view taken on the line 20—20 of Figure 19 looking in the direction indicated by the arrows, and Figure 21 is a sectional view of a further modified form of the invention.

As this description proceeds, it will be observed that certain features of the invention shown in Figures 1 to 4 are common to the form of the invention shown in Figures 7 to 10, both inclusive, and, therefore, a description of the structure common to these figures appearing in Figures 1 to 4 need not be repeated as to Figures 7 to 10.

Referring now more particularly to the drawings, and first to Figures 1 to 4, I provide a clamp including object-engaging jaw members 5 and 6, said jaw members being conveniently castings of a durable metal and each provided with slots 7 and 8 arranged along their respective longitudinal axes and which slots are adapted to align when assembled in operating position for a purpose which will presently appear.

The device of Figures 1 to 4, and its detail Figures 5 and 6, is adapted for universal application to objects to be held, that is to say, the engaging jaw surfaces are adjustable in angular disposition so as to support objects to be held in desired angular relationships within reasonable limits.

The jaw member 5 is provided, in one end thereof, with a substantially V-shaped transverse groove 8, the outwardly diverging walls of which terminate in transverse flat surfaces 9 and 10. These flat surfaces are, in each instance, provided with recesses 11 and 12 whose inner surfaces are each described about the arc of a circle as seen in Figures 1 and 3.

The jaw member 6 is provided with an outer curved surface 13 and an inner flat surface 14 terminating in outwardly diverging flat surfaces 15 and 16. Similarly to the jaw member 5, the jaw member 6 is provided with recesses 17 and 18 in its inner surfaces 14, 15 and 16 complemental to the recesses 11 and 12.

Within the confines of the recesses 11, 12, 17 and 18, I provide object-engaging angularly adjustable jaws 19, 20, 21 and 22, respectively, these jaws being constructed as best shown in Figures 5 and 6, wherein one of them, indicated at 19, is shown. These jaw members are semi-circular and their semi-circular surfaces, indicated at 23, 23, are adapted to seat in the complemental recesses 11, 12, 17 and 18, and to be rotatable thereon so that the flat outer surfaces 24, 24 of said jaws will adapt themselves to the desired angular relationship for gripping an object therebetween. In order to retain the jaws in position in their respective recesses, the opposite plane surfaces 25, 25 thereof are provided with arcuate recesses 26, 26, in which retaining pins 27, 27, carried in the jaw members, engage for the dual purpose of retaining the jaws in position and limiting their angular rotation.

The manner in which the jaws 19, 20, 21 and 22 engage a plurality of objects is shown in Figures 1 and 3, wherein, in the one instance, the plates 28 and 29 are grasped so as to be in abutting alignment and, in the other instance, to be in angular contiguous relationship.

In order to tie the two jaw members together and to facilitate their dis-assembly from the work, that is, the objects engaged, I provide a tying member, such as a strap 30, of sheet steel which possesses a certain amount of inherent flexibility and is anchored in one of the jaw members and grippingly engaged, by elements to be presently described, in the other jaw element.

The strap 30 is anchored in the jaw member 6 by the provision of a flaring enlargement 31 of the slot 8 and by rolling the end of the strap 30 about a pin 32, as indicated at 33. It will be observed that the shank of the strap 30 lies between the sheets or plates 28 and 29 or between any other objects similarly engaged by the clamp of this invention, but it is pointed out that this is not a disadvantage, for the reason that the slight spacing of the contiguous margins of the plates 28 and 29 at each clamp substantially disappears after spot-welding and upon removal of the clamp, this space being later filled with the welding metal. Of course, it is understood that the edges of the plates 28 and 29, as viewed in Figure 3, are chamfered off to receive the welding metal, as is common practice, this not being necessary in the case of Figure 1, as the position of the contiguous margins of the plates 28 and 29 in this position afford a natural groove for receiving the metallic deposit for welding.

In order to draw the strap 30 through the jaw member 5 and thus draw the jaw members 5 and 6 toward each other, I provide what I term a cross-head member or block 35 seated in a recess 36 formed in an extension 37 of the jaw member 5. The extension 37 thus serves to house and guide the cross-head block 35 in performing its function.

Transversely of the axis of the strap 30, which, for convenience, I have termed the longitudinal axis of the clamp, I provide a transverse bifurcated wedge member 38 comprising the spaced parallel arms 39 and 40 which are adapted to abut, on the one edge, oppositely disposed lug portions 41 and 42, and on the other edges engage in complementally formed recesses 43 and 44 formed in the outer faces of the cross-head block 35. In order to prevent spreading of the arms 39 and 40 of the wedge member 38 the block 35 is provided with lugs 35a, 35a, which overlap the arms 39 and 40, as best shown in Figures 1, 2 and 4. The inner surfaces of the recesses 43 and 44 are preferably curved, as indicated at 46 in Figures 1 and 3, which facilitates the insertion of the narrow ends of the wedge arms 39 and 40.

It will be observed that by transverse movement of the wedge member 38 a tendency to separation of the jaw member 5 and the cross-head block 35 will take place.

In order to transfer the tendency to separate of the jaw member 5 and the cross-head block 35 to the strap 30, and thus bring the jaw members 5 and 6 together into clamping position, the cross-head block 35 is provided with a tapered longitudinal recess 35b, whose diverging walls 47 and 48 receive complementally shaped faces of auxiliary wedge members 49 and 50, between which the shank of the strap 30 extends. The auxiliary wedge members 49 and 50 are provided with serrated inner surfaces 51, 51, which further insures the wedge members 49 and 50 firmly engaging the adjacent surfaces of the strap 30. It will be understood that for some purposes one of the wedge members 49 may be omitted, but in order to insure proper alignment of the strap and prevent a tendency to distortion thereof, I prefer to employ a pair of wedge members 49 and 50, as described.

As a safety measure, the strap 30 may be provided with a series of apertures 52, and when the wedge member 38 has been driven in, to draw up the cross-head and thus the jaws firmly into engagement with the object, a transverse pin 53 may be inserted in the nearest opening to the wedge members 49 and 50, the outer end of the cross-head block 35 being provided with recesses 54, 54, in the walls thereof for accommodating such pin.

In order to prevent the auxiliary wedge members 49 and 50 from dropping out of the cross-head 35 when it is assembled, and thus becoming lost, I provide studs 55, 55 in the walls of the cross-head block which project back of the larger ends of the wedge members 49 and 50 and thus retain them in the cross-head block.

Referring now to the form of the invention shown in Figures 7 and 8, the jaw members 5a and 6a are constructed internally in all respects, with the exceptions hereinafter noted, similarly to the jaw members 5 and 6 of Figures 1 to 4, and the wedge gripping means for the strap 30a and the transverse wedge member 38a operate identically with the complemental structure of Figures 1 to 4. However, in this form of the invention, which I term a simplified form, the jaw members 5a and 6a are actually the jaws of the gripping structure and are provided with straight transverse faces 57 and 58, respectively, for engagement with objects which are adapted to be held in abutting alignment, as indicated at 59 and 60.

In the form of the invention shown in Figures 9 and 10, here again the jaw members 5b and 6b are the elements which contact with the work. However, in this form of the invention the gripping faces 61 and 62 thereof, respectively, are disposed at a permanent angle of, say, 45 degrees, or at such angle as the user may desire and order the clamp to be made.

For some purposes the forms of the invention shown in Figures 7 to 10 will be preferred, whereas, for other purposes, the form of the invention shown in Figures 1 to 4 may be found desirable.

In order to facilitate application of a plurality of the clamps of this invention to an object, such as a sheet metal tank which is to be welded, and in order to pull the walls of the tank into proper angular relationship by means of cables and turn-buckles, the jaw members 5, 5a and 5b may be provided with suitable apertures 63, 64 and 65.

Figure 11 serves to illustrate the application of a plurality of clamps of this invention for holding the side and end walls of a tank in position for spot welding. The clamps are schematically shown at 66, 66, connected by cables 67, 67 in which turn-buckles 68, 68 are inserted for pulling up the cables after the clamps are in position and thus aligning the tank walls 69 in desired position for welding.

Referring now more particularly to the form of the invention illustrated in Figures 12, 13 and 14, I provide jaw carrying members 70 and 71, whose opposite faces are constructed similarly to the device of Figures 1 to 4, that is, the jaw carrying member 70 is recessed in the point 72 and the jaw member 71 is recessed at the point 73 for reception of gripping jaw members 74 and 75, respectively. These gripping jaw members are angularly adjustable in the recesses 72 and 73 and are retained in position by the provision of pins 73a and 74b. The jaw members 74 and 75 are arranged to grippingly engage the work which is illustrated as the plates 74a and 75a.

In order to bring the jaw members into gripping engagement with the work, I provide lugs 76 and 77 on opposite outer surfaces of the jaw member 71. These lugs being spaced to form a slot 77a (see Figure 12) whose outer end is flared as indicated at 76a.

The lugs 76 and 77 receive the straps 78 and 79 whose adjacent ends are provided with enlarged portions 78a and 79a which are adapted to seat in the flare portions of the slots 77a.

The straps extend between the opposed edges of the plates 74a and 75a into openings 82 and 83, formed in the cross-head member 81, the latter being seated in a transverse recess 80, formed in the jaw carrying member 70.

In order to reinforce the jaw member 70 at the point adjacent to the recess 80, I provide external flanges 80a, 80a. The openings 82 and 83 are preferably V-shaped to receive wedge members 84 and 85, which are provided with serrated surfaces for engagement with the adjacent strap and which engage the walls of the openings 82 and 83 as will be seen from an inspection of Figure 12.

In order to prevent accidental dis-engagement of the straps 78 and 79 from the wedges 84 and 85, I provide safety pins 84a which I extend through suitable openings in the straps back of the wedges, the cross-head being appropriately recessed as at 84b to permit of the insertion of said pins.

In order to set up motion between the cross-head 81 and the jaw carrying member 70, I provide, in the present arrangement, a screw member 86 having threaded engagement in an opening 87 in the cross-head 81, said screw abutting the bottom of the recess 80 (see Figure 14). It will be observed that upon rotating the screw 86 in the cross-head 81, the screw will act upon the bottom of the recess 80 to tend to force the cross-head 70 away from the jaw carrying member 70 and thus exerting a pull on the straps 78 and 79, thereby gripping the work between the jaw members 74 and 75.

As a modified form of cross-head, reference may be had to Figures 19 and 20. The cross-head is indicated at 88 and may take the form shown in Figures 1 to 4 or of the form shown in Figures 7 to 10 or 12 to 14. In the previous forms described a wedge is employed. In the form shown in Figures 19 and 20 the wedging means takes a form of rollers 88a, which is adapted to engage the strap 30, passing through an opening 89 whose wall 89a is inclined thereto. The roller will settle in the wedge-shaped opening thus provided and grippingly engage the strap 30 similarly to an ordinary wedge.

However, difficulty is sometimes experienced in disengaging the roller 88a. To overcome this I provide a handle member 91, substantially U-shaped in form and provided with eyes 92 which engage the trunnions 92a formed on the roller 88a. This handle 91 projects at all times beyond the larger end of the opening 89 so that it may be grasped for dis-engaging the roller 88a from the strap 30. In order to prevent the roller falling out of the cross-head a retainer pin 93 projects into the path of the roller near the larger end of the opening 89.

Referring now more particularly to Figures 15 to 18, I provide a further alternative form of the invention. Here the jaw member 93 is provided with angularly disposed gripping faces 95 and 95c against which the work represented by the plates 93a and 94a engages.

The movable jaw member is indicated at 94 and is provided with an opening through which the tying strap 95a may pass, said strap having an enlarged portion 96 for engagement with the abutments 97 formed on the jaw member 94. The enlarged portion 96 abuts a stop member 98 secured at 99 to the jaw member 94 so as to maintain the strap and jaw member 94 in permanent engagement with each other, yet permitting of slight relative movement of the two.

The jaw member 93 is provided with an enlarged abutment 93b having a surface 102 for engagement with the wedge member 111, this wedge member comprising spaced arms 109 and 110 and a transverse stop member 110a.

The wedge member is adapted to pass through the cross-head member 103 which is received between the two spaced arms 100 and 101, formed on the jaw member 93. The cross-head is provided with spaced abutting side members 107 whose inner ends engage opposite sides of the spaced arms 109 and 110 and the wedge surface of the wedge member 111 engages a surface 112 of the cross-head 103, this surface being formed in the recess 106.

The cross-head and the jaw member are arranged for a relative movement but permanently connected together by the provision of slots 104 in the arms 100 and 101 through which retaining bolts 105 are adapted to pass into threaded engagement with the walls 107 of the cross-head 103.

It will be observed that upon driving the wedge member 111 into position, the cross-head and the jaw member 93 will be caused to separate. In order to impart this motion to the strap 95a, the latter passes through a suitable slot in the cross-head and a securing wedge member 113 passes transversely through the cross-head 103 and wedgingly engages the strap 95a by engagement with the aperture 114 formed in the cross-head 103.

In this form of the invention it will be observed that the wedge 111 cannot move entirely out of the cross-head and, therefore, the wedge member 111 and said cross-head are a unit structure together with the jaw member 93. The strap is substantially a unit structure with the jaw member 94 so that there are only two major parts or units to this form of the invention. The wedge 113 may be removed entirely from the cross-head, but if desired the smaller end of the wedge 113 may be provided with a transverse retaining pin 113a, thus preventing entire removal of this element.

This form of the invention operates similar to the forms already described, in that upon driving the wedge 113 into position to grip the strap 95a and upon forcing the wedge 111 inwardly, the two jaw members 93 and 94 are brought into gripping engagement with the plates 93a and 94a.

Referring now to Figure 21 which is a modified form of the cross-head, such, for example, as shown in Figure 3, I provide the cross-head block 116 having a transverse recess 117, said recess communicating with a longitudinal slot 118 similarly formed to the recess formed in the cross-head 35 and arranged to receive one or a pair of wedge members 119. The wedge member 119 is adapted to engage the strap 30, and to facilitate disengagement of the wedge from the strap, I provide lugs 120 formed on said wedge and extending toward the opposite extremities of the recess 117. Between the lugs 120 and shoulders 121 of the cross-head, I provide helical springs 122, tending to urge the wedge outwardly. The wedge is prevented against complete displacement from the cross-head by the provision of stop pins 123. It will be seen that the springs 122 tend to urge the wedge members out of engagement with the strap 30, but upon engagement with said strap in assembly of the device, said wedges will be drawn into engagement with the strap against the tension of the springs 122 and said wedges will engage the strap frictionally until released, as pointed out above.

Having thus described my invention and illustrated its use, what I claim as new and desire to secure by Letters Patent is:

1. In a clamp, a pair of gripping jaws, means for tying said jaws together, and means acting transversely of the axis of said tying means for bringing said jaws into gripping engagement with an object.

2. In a clamp, a pair of gripping jaws, separable means for tying said jaws together, and means acting transversely of the axis of said tying means for bringing said jaws into gripping engagement with an object.

3. In a clamp, a pair of gripping jaws, means for tying said jaws together extending through the same and anchored in one of them, and means on the other jaw engaging said tying means for bringing said jaws into gripping engagement with an object.

4. In a clamp, a pair of gripping jaws, means for tying said jaws together extending through the same and anchored in one of them, a crosshead separable from and mounted on one of said jaws, and means carried by said crosshead and adapted for engagement with said tying means.

5. In a clamp, a pair of gripping jaws, means for tying said jaws together extending through the same and anchored in one of them, a crosshead separable from and mounted on one of said jaws, and gripping means carried by said crosshead and adapted for engagement with said tying means.

6. In a clamp, a pair of gripping jaws, means for tying said jaws together extending through the same and anchored in one of them, a crosshead separable from and mounted on one of said jaws, means engaging one of said jaws and said crosshead for urging relative movement therebetween, and means carried by said crosshead and adapted for gripping engagement with said tying means, said gripping means being urged into action by relative movement of the crosshead and jaw.

7. In a clamp, a pair of gripping jaws, means for tying said jaws together including a flexible strap extending through the same and anchored in one of them, and means on the other jaw engaging said tying means for bringing said jaws into gripping engagement with an object.

8. In a clamp, a pair of gripping jaws, a removable tying strap connecting said jaws, said jaws being slotted to receive said strap, and a crosshead member removably mounted on one of said jaws for engagement with one end of said strap.

9. In a clamp, a pair of gripping jaws, a removable tying strap connecting said jaws, said jaws being slotted to receive said strap, a crosshead member removably mounted on one of said jaws, and wedge means on said crosshead engaging one end of said strap.

10. In a clamp, a pair of gripping jaws, a removable tying strap connecting said jaws, said jaws being slotted to receive said strap, a crosshead member removably mounted on one of said jaws, means for urging said crosshead in one direction on said jaw, and wedge means on said crosshead engaging one end of said strap.

11. In a clamp, a pair of gripping jaws, a removable tying strap connecting said jaws, said jaws being slotted to receive said strap, a crosshead member removably mounted on one of said jaws, means including a separable wedge member for urging said crosshead in one direction on said jaw, and wedge means on said crosshead engaging one end of said strap.

12. In a clamp, a pair of gripping jaws, including angularly related gripping surfaces, and means acting transversely of the axis of said clamp for bringing said jaws into gripping engagement with an object.

13. In a clamp, a pair of gripping jaws, a crosshead on one of said jaws, a tying member connecting said crosshead and one of said jaws, and means for setting up motion between said crosshead and one of said jaws.

14. In a clamp, a pair of gripping jaws, a crosshead on one of said jaws, a tying member connecting said crosshead and one of said jaws, and means for setting up motion between said crosshead and the other of said jaws.

15. In a clamp, a pair of jaw members adapted to engage two or more abutting objects, means for tying said jaws together and adapted to pass between the objects engaged, a crosshead on one of said jaws engaging said tying means, and means for setting up motion between the crosshead and one of said jaws for bringing the latter into gripping engagement with such objects.

16. In a clamp, a pair of jaw members adapted to engage two or more abutting objects, a strap for tying said jaws together, said strap being anchored in one of said jaw members and adapted to pass between the objects engaged, a crosshead on one of said jaws engaging said tying means, and means for setting up motion between the crosshead and one of said jaws for bringing the latter into gripping engagement with such objects.

17. In a clamp, a pair of gripping jaw members, a crosshead carried by one of said jaw members, means for tying the jaw members together and releasably connected to said crosshead, and means engaging the crosshead and one of said jaw members for separating the same to bring said jaw members into gripping engagement with an object.

18. In a clamp, a pair of gripping jaw members, a crosshead carried by one of said jaw members, means for tying the jaw members together and releasably connected to said crosshead, and means engaging the crosshead and one of said jaw members, and acting transversely of the axis thereof, for separating the same to bring said jaw members into gripping engagement with an object.

19. In a clamp, a pair of separate jaw members, a crosshead carried by one of said jaw members and slidably mounted therein, a tying member anchored in one of said jaw members and releasably engaging said crosshead, and a wedge member for moving said crosshead relatively to said jaw members.

20. In a clamp, a pair of separate jaw members, a crosshead carried by one of said jaw members and slidably mounted therein, a tying member anchored in one of said jaw members and releasably engaging said crosshead, and a wedge member, acting transversely of said jaw members, for moving said crosshead relatively to said jaw members.

21. In a clamp, a pair of separate jaw members, a crosshead carried by one of said jaw members and slidably mounted therein, a tying member anchored in one of said jaw members and releasably engaging said crosshead, and a screw member for setting up motion between said crosshead and said jaw members.

22. In a clamp, a pair of separate jaw members, a crosshead carried by one of said jaw members and slidably mounted therein, a tying member anchored in one of said jaw members and releasably engaging said crosshead, means for preventing complete separation of said crosshead from the jaw member on which it is mounted, and means for retaining said tying member in the jaw member on which it is mounted.

23. In a clamp, a pair of separate jaw members, a crosshead carried by one of said jaw members and slidably mounted therein, a tying member anchored in one of said jaw members and releasably engaging said crosshead, means for preventing complete separation of said crosshead from the jaw member on which it is mounted, and means for retaining said tying member in the jaw member on which it is mounted, and a wedge member on one of said jaws for engaging said crosshead, and means for preventing complete removal of said wedge member.

24. In a clamp, a cross head having a tapered aperture therein, adapted to receive a tying member, and a gripping means in said aperture comprising a revoluble member and a handle therefor.

25. In a clamp, a cross head having an aperture therein, adapted to receive a tying member and a gripping means in said aperture comprising a wedge member, and resilient means for urging movement of said member in one direction.

26. In combination with a plurality of plates arranged in angular relationship to form a receptacle, of means for holding said plates in angular relationship while being spot welded, said means comprising spaced clamps disposed at the corners of the receptacle and gripping the adjacent edges of said plates but leaving exposed substantial portions of said edges immediately adjacent to each other, and means for exerting tension on said clamps for pulling the plates into desired relationship.

27. In combination with a plurality of plates arranged in angular relationship to form a receptacle, of means for holding said plates in angular relationship while being spot welded, said means comprising spaced clamps disposed at the corners of the receptacle and gripping the adjacent edges of said plates but leaving exposed substantial portions of said edges immediately adjacent to each other, and cables having turnbuckles therein for exerting a pull on said clamps for properly aligning said plates.

28. In a clamp, a pair of jaw members, a removable tying member anchored to one of said jaw members and extending to and adjustably connected with the other of said members, angularly adjustable gripping jaws carried by said jaw members adapted to engage opposite faces of an object to be held, and means for retaining said jaws on said jaw members.

29. In a clamp, a pair of jaw members, a removable tying member anchored to one of said jaw members and extending to and adjustably connected with the other of said members, angularly adjustable gripping jaws carried by said jaw members adapted to engage opposite faces of an object to be held, means for placing said tying means under tension for bringing said jaws into clamping engagement with an object, such clamping engagement maintaining the relative angular adjustment of said jaws.

30. In a clamp, a pair of separate jaw members, a crosshead carried by one of said jaw members and relatively movable therein, a plurality of tying members anchored in one of said jaw members and extending along the sides of the other of said jaw members, means for connecting said tying members to said crosshead, and a screw member for setting up motion between said crosshead and said jaw members.

31. In a clamp, a pair of separate jaw members, provided with complemental gripping faces, slots in said jaw members, a tying strap passing through said slots and permanently anchored in one of said jaw members, one of said jaw members having an enlarged abutment and spaced rearwardly extending arms, a crosshead slidably mounted between said arms and having a slot therein for receiving said strap, means for imparting relative movement to said jaw members and crosshead comprising a transversely extending wedge member having an enlargement on the smaller end thereof to prevent complete removal thereof, and means engaging said crosshead and spaced arms for preventing complete separation thereof.

32. In a clamp, a crosshead having a tapered aperture therein, adapted to receive a tying member, and gripping means in said aperture including a wedge member, resilient means for urging movement of said wedge member outwardly, and stop means for preventing entire removal of said wedge member.

In testimony whereof, I have hereunto signed my name.

EDWARD G. TODT.